(12) United States Patent
Kamijima

(10) Patent No.: US 12,498,712 B2
(45) Date of Patent: Dec. 16, 2025

(54) METHOD AND SYSTEM FOR PROVIDING MAINTENANCE SERVICE FOR RECORDING MEDIUM INCLUDED IN ELECTRONIC DEVICE

(71) Applicant: Panasonic Intellectual Property Management Co., Ltd., Osaka (JP)

(72) Inventor: Junya Kamijima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 365 days.

(21) Appl. No.: 18/127,039

(22) Filed: Mar. 28, 2023

(65) Prior Publication Data

US 2023/0236590 A1 Jul. 27, 2023

Related U.S. Application Data

(63) Continuation of application No. PCT/JP2021/029331, filed on Aug. 6, 2021.

(30) Foreign Application Priority Data

Oct. 8, 2020 (JP) .................................. 2020-170726

(51) Int. Cl.
G05B 23/02 (2006.01)
G06F 11/14 (2006.01)
G06F 11/30 (2006.01)

(52) U.S. Cl.
CPC ..... G05B 23/0283 (2013.01); G05B 23/0264 (2013.01); G06F 11/1448 (2013.01); G06F 11/3034 (2013.01)

(58) Field of Classification Search
CPC ............ G05B 23/0283; G05B 23/0264; G05B 23/0267; G06F 11/1448; G06F 11/1662;
(Continued)

(56) References Cited

U.S. PATENT DOCUMENTS

2003/0172317 A1* 9/2003 Tsunoda ........... H04N 21/42684
714/6.32
2004/0220778 A1 11/2004 Imai et al.
(Continued)

FOREIGN PATENT DOCUMENTS

JP 2003-044126 A 2/2003
JP 2014-071892 A 4/2014
(Continued)

OTHER PUBLICATIONS

The EPC Office Action dated Oct. 27, 2023 for the related European Patent Application No. 21877234.1.
(Continued)

*Primary Examiner* — Manuel L Barbee
(74) *Attorney, Agent, or Firm* — Renner, Otto, Boisselle & Sklar, LLP

(57) ABSTRACT

A method executed by an arithmetic circuit of one or a plurality of computers includes periodically collecting log information from an electronic device, inputting the log information collected before a current clock time from the electronic device to a prediction model, causing the prediction model to predict an abnormal or normal operating state of a recording medium after the current clock time, and transmitting replacement notification information that is based on a prediction result to the electronic device. The prediction model is generated by performing machine learning using, as training data, training log information collected within a predetermined period up to a reference clock time from a plurality of training electronic devices each including a training recording medium, and state information indicating an operating state of the training recording medium determined after the reference clock time.

22 Claims, 8 Drawing Sheets

(58) Field of Classification Search
CPC ............... G06F 11/1658; G06F 11/008; G06F 11/2094; G06F 11/3058; G06F 11/3409; G06F 11/0727; G06F 3/0679; G06F 3/0616; G06F 3/0653
See application file for complete search history.

(56) References Cited

U.S. PATENT DOCUMENTS

| | | |
|---|---|---|
| 2005/0010586 A1 | 1/2005 | Ishidera |
| 2015/0222476 A1 | 8/2015 | Kondo et al. |
| 2016/0232450 A1* | 8/2016 | Chen .................. G06F 11/3058 |
| 2019/0138415 A1 | 5/2019 | Chen et al. |
| 2019/0281172 A1* | 9/2019 | Baba ..................... G06N 3/084 |
| 2020/0004435 A1* | 1/2020 | Borlick ................. G06N 3/084 |
| 2022/0027057 A1* | 1/2022 | Kim ...................... G06F 3/0605 |
| 2023/0017961 A1* | 1/2023 | Ronnau ............... G06F 11/1469 |
| 2023/0118103 A1* | 4/2023 | Bernat ................ G06F 11/0751 714/2 |

FOREIGN PATENT DOCUMENTS

| | | |
|---|---|---|
| JP | 2019-087217 A | 6/2019 |
| JP | 2019-159730 A | 9/2019 |
| JP | 2020-129275 A | 8/2020 |
| WO | 2003/071459 A1 | 8/2003 |

OTHER PUBLICATIONS

Su Chuan-Jun et al: "Recurrent neural network based real-time failure detection of storage devices", Microsystem Technologies, Berlin, DE, vol. 28, No. 2, May 18, 2019 (May 18, 2019), pp. 621-633, XP037779335.

* cited by examiner

FIG. 2

| CLOCK TIME | DEVICE PRODUCT NUMBER | SERIAL NUMBER | S.M.A.R.T. INFORMATION | DEVICE USAGE INFORMATION ||||||| |
|---|---|---|---|---|---|---|---|---|---|---|
| | | | | TEMPERATURE | APPLICATION INFORMATION | SSD POWER CONSUMPTION | USED TIME | MANUFACTURE DATE | START-USING DATE | ... |
| 200823 09:00 | ... | ... | ... | ... | ... | ... | ... | ... | ... | ... |
| ... | ... | ... | ... | ... | ... | ... | ... | ... | ... | ... |

| CLOCK TIME | DEVICE PRODUCT NUMBER | SERIAL NUMBER | S.M.A.R.T. INFORMATION | DEVICE USAGE INFORMATION | | | | | | STATE INFORMATION |
|---|---|---|---|---|---|---|---|---|---|---|
| | | | | TEMPERATURE | APPLICATION | USED TIME | POWER CONSUMPTION | MANUFACTURE DATE | | |
| ... | ... | ... | ... | ... | ... | ... | ... | ... | ... | ... |
| t1 | X1 | ... | ... | ... | ... | ... | ... | ... | ... | NORMAL |
| t2 | X1 | ... | ... | ... | ... | ... | ... | ... | ... | NORMAL |
| t3 | X1 | ... | ... | ... | ... | ... | ... | ... | ... | NORMAL |
| t4 | X1 | ... | ... | ... | ... | ... | ... | ... | ... | NORMAL |
| t5 | X1 | ... | ... | ... | ... | ... | ... | ... | ... | NORMAL |
| t6 | X1 | ... | ... | ... | ... | ... | ... | ... | ... | DETERIORATED |
| t7 | X1 | ... | ... | ... | ... | ... | ... | ... | ... | DETERIORATED |
| ... | ... | ... | ... | ... | ... | ... | ... | ... | ... | ... |

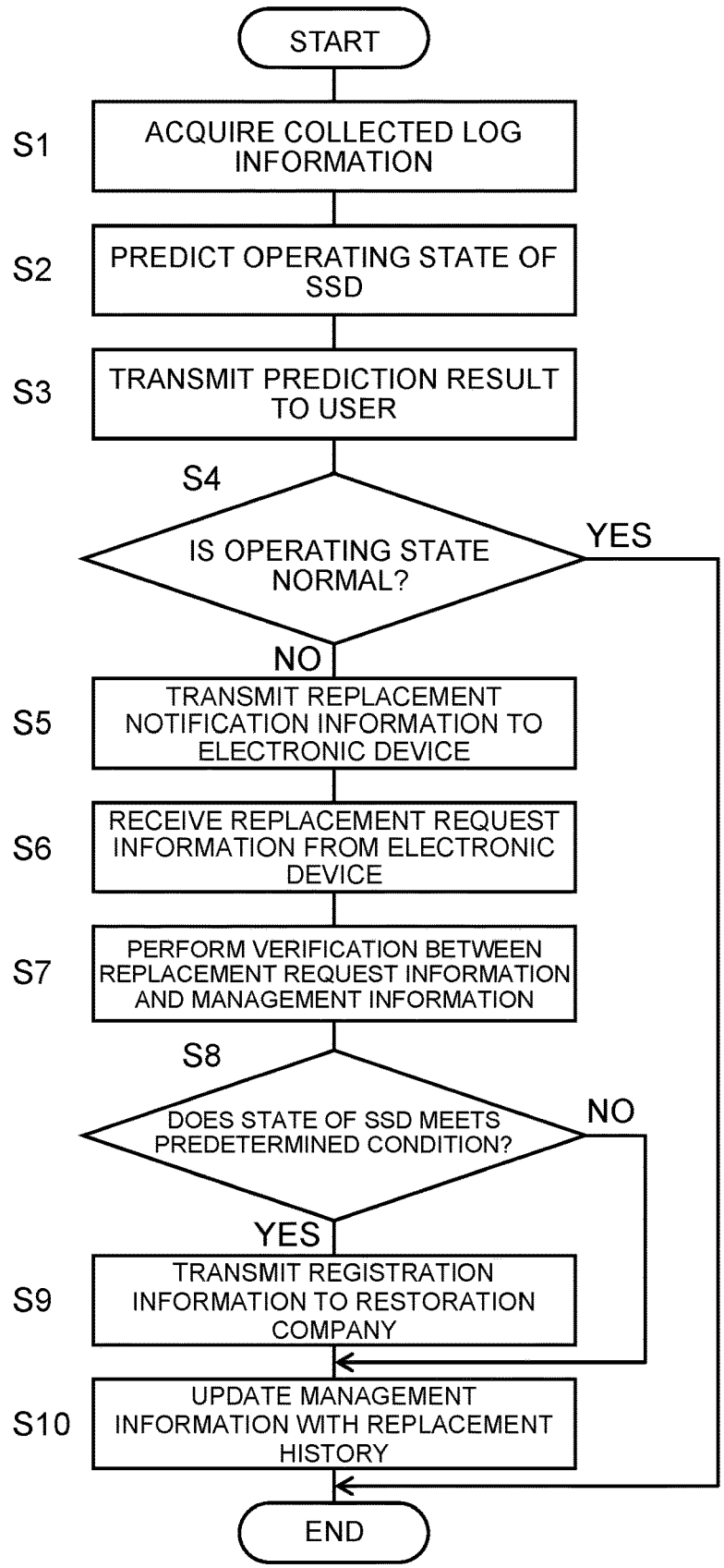

METHOD AND SYSTEM FOR PROVIDING MAINTENANCE SERVICE FOR RECORDING MEDIUM INCLUDED IN ELECTRONIC DEVICE

TECHNICAL FIELD

The present disclosure relates to a method and a system for providing maintenance service for a recording medium included in an electronic device.

BACKGROUND ART

Patent Literature 1 discloses a method for diagnosing remaining life of a storage device in a data center. The method in Patent Literature 1 collects an operation attribute of a damaged storage device and a time record up to the occurrence of the damage, and generates a trend model that generates remaining life of the storage device from the operation attribute and the time record up to the occurrence of the damage using an algorithm such as machine learning. When a set of operation attributes of a storage device in operation is input, the trend model calculates the remaining life of the storage device. In the method in Patent Literature 1, an administrator of the data center is provided with calculated remaining life data so that the administrator can determine whether to make a backup of the storage device or replace the storage device, and restore the storage device.

CITATION LIST

Patent Literature

PTL 1: Unexamined Japanese Patent Publication No. 2019-87217

SUMMARY OF THE INVENTION

The present disclosure provides a method and a system for providing maintenance service that predicts an operating state of a recording medium included in an electronic device and enhances convenience of a user.

A method according to one aspect of the present disclosure is a method for providing maintenance service for a recording medium included in an electronic device, the method being executed by an arithmetic circuit of one or a plurality of computers, the method including periodically collecting log information from the electronic device, inputting the log information collected before a current clock time from the electronic device to a prediction model, causing the prediction model to predict an operating state of the recording medium, the operating state being after the current clock time, and transmitting replacement notification information to the electronic device, the replacement notification information being based on a prediction result indicating the operating state that has been predicted. The prediction model is generated by performing machine learning using, as training data, training log information collected within a predetermined period up to a reference clock time from a plurality of training electronic devices each including a training recording medium, and state information indicating an operating state of the training recording medium determined after the reference clock time. The log information is information associating clock time information with information related to an operating state of the electronic device and the recording medium. The operating state that has been predicted is abnormal or normal.

A system according to one aspect of the present disclosure is a system for providing maintenance service for a recording medium included in an electronic device, the system including an arithmetic circuit, a storage device that stores a prediction model for predicting an operating state of the recording medium, and a communication circuit that receives log information from the electronic device. The arithmetic circuit periodically collects log information from the electronic device, inputs the log information collected before a current clock time from the electronic device to the prediction model, causes the prediction model to predict an operating state of the recording medium, the operating state being after the current clock time, and transmits, by the communication circuit, replacement notification information to the electronic device, the replacement notification information being based on a prediction result indicating the operating state that has been predicted. The prediction model is generated by performing machine learning using, as training data, training log information collected within a predetermined period up to a reference clock time from a plurality of training electronic devices each including a training recording medium, and state information indicating an operating state of the training recording medium determined after the reference clock time. The log information is information associating clock time information with information related to an operating state of the electronic device and the recording medium. The operating state that has been predicted is abnormal or normal.

According to the method and the system for providing maintenance service according to the present disclosure, an operating state of a recording medium included in an electronic device can be predicted, and convenience of a user can be enhanced.

BRIEF DESCRIPTION OF THE DRAWINGS

FIG. 2 is a figure for describing log information.

FIG. 7 is a figure for explaining a process of generating a prediction model using training data.

FIG. 9 is a flowchart illustrating an operation of a maintenance server according to the second exemplary embodiment.

DESCRIPTION OF EMBODIMENT

Hereinafter, a method and a system for providing maintenance service according to an exemplary embodiment will be described with reference to the accompanying drawings. In the description below, similar components are denoted by the same reference marks. Repeated description for such components will be omitted as appropriate.

First Exemplary Embodiment

In a first exemplary embodiment, as an example of executing a method for providing maintenance service according to the present disclosure, a maintenance system that causes a maintenance server to predict an operating state of a solid state drive (SSD) included in an electronic device and provide information that is based on a prediction result will be described. In the specification, the SSD itself may be referred to as "recording medium". It should be noted that the term "recording medium" means in a narrow sense a memory chip in an SSD and a hard disk in a hard disk drive, for example, but may also be used in a broad sense as a term meaning a storage device in the specification.

1. Configuration

A configuration of the maintenance system according to the first exemplary embodiment will be described with reference to FIG. 1.

Figure 1:
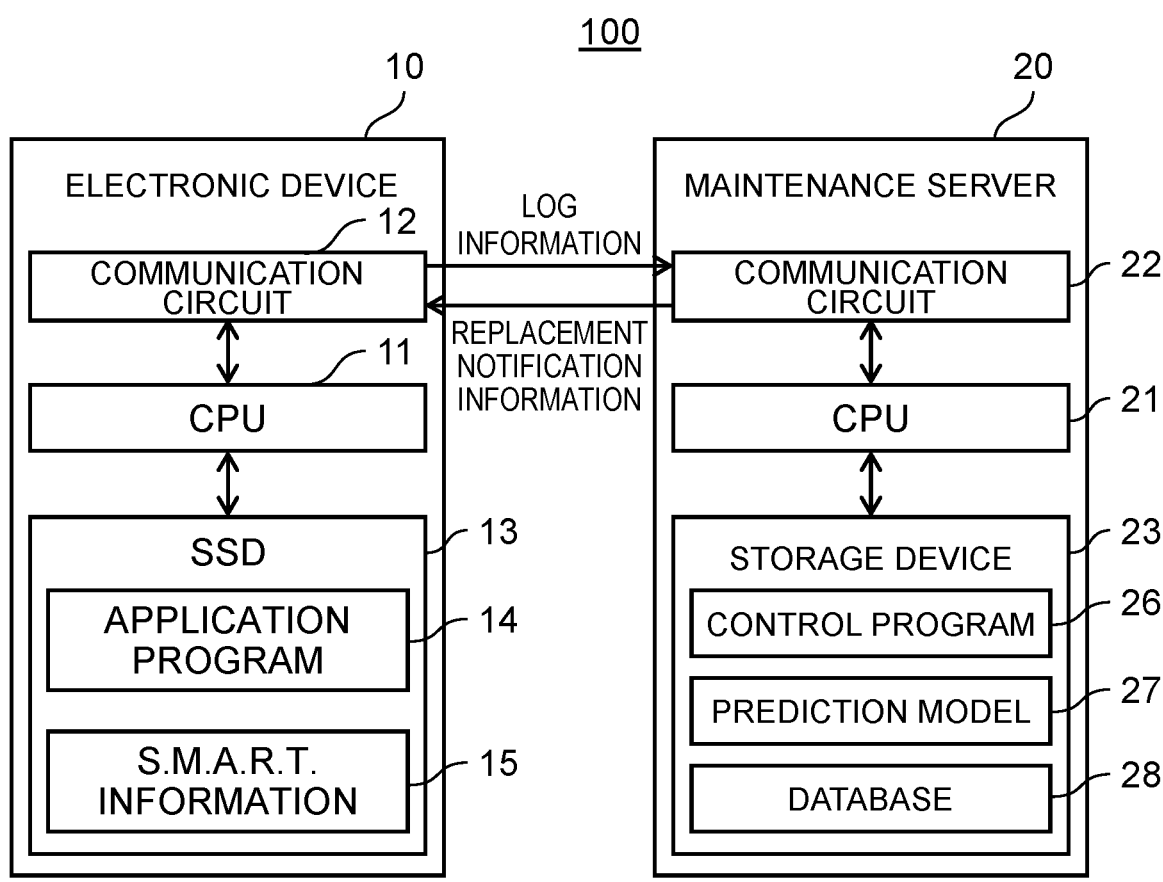
FIG. 1 is a figure illustrating an overall configuration of a maintenance system according to a first exemplary embodiment.

FIG. 1 is a block diagram illustrating an overall configuration of maintenance system 100 according to the present exemplary embodiment. Maintenance system 100 includes one or a plurality of electronic devices 10 including SSD 13, for example, and maintenance server 20 including prediction model 27 generated by machine learning. In present system 100, maintenance server 20 functions as a system (device) providing maintenance service for SSD 13. Maintenance server 20 periodically collects log information from electronic device 10 via a communication network (not illustrated) such as the Internet, for example, and causes prediction model 27 to predict the operating state of SSD 13. As an example of providing maintenance service for SSD 13, maintenance server 20 transmits replacement notification information that is based on a prediction result of the operating state to electronic device 10.

1-1. Maintenance Server and Electronic Device

An exemplary configuration of maintenance server 20 and electronic device 10, which is an example of a system providing maintenance service in present system 100, will be described below with reference to FIG. 1.

Maintenance server 20 is configured as, for example, an information processing device such as a computer. Maintenance server 20 includes CPU 21 that performs arithmetic processing, communication circuit 22 for communication with other devices, and storage device 23 that stores data and a computer program.

CPU 21 is an example of an arithmetic circuit of the information processing device of the present exemplary embodiment. CPU 21 realizes a predetermined function including training and execution of prediction model 27 by executing control program 26 stored in storage device 23. Maintenance server 20 realizes a function as a maintenance service providing system of the present exemplary embodiment by CPU 21 executing control program 26. Note that, the arithmetic circuit configured as CPU 21 in the present exemplary embodiment may be configured by various kinds of processors such as an MPU or a GPU, or may be configured by one or a plurality of processors.

Communication circuit 22 is a communication circuit that performs communication in accordance with a standard such as IEEE 802.11, 4G, or 5G. Communication circuit 22 may perform wired communication in accordance with a standard such as Ethernet (registered trademark). Communication circuit 22 is connectable to a communication network such as the Internet. Furthermore, maintenance server 20 may directly communicate with another device via communication circuit 22, or may communicate via an access point.

Storage device 23 is a storage medium that stores a computer program and data necessary for realizing a function of maintenance system 100, and stores control program 26 executed by CPU 21, prediction model 27, and various kinds of data. Details of prediction model 27 will be described later. Storage device 23 is configured as, for example, a magnetic storage device such as a hard disk drive (HDD), an optical storage device such as an optical disk drive, or a semiconductor storage device such as an SSD. Storage device 23 may include a temporary storage element configured by a RAM such as a DRAM or an SRAM, or may function as an internal memory of CPU 21.

Database 28 manages log information that is input to prediction model 27, training data for prediction model 27, and the like. The training data includes data in which log information collected within a predetermined period up to a reference clock time from a plurality of electronic devices each including an SSD as a recording medium is associated with state information indicating an operating state of each of the recording mediums determined after the reference clock time. A plurality of clock times may be set as reference clock times. The log information is information in which clock time information is associated with information related to electronic device 10 and an operating state of SSD 13. Details of the log information will be described later.

Electronic device 10 is configured to be able to communicate with maintenance server 20 via a communication network. Electronic device 10 is, for example, a personal computer (PC), or may be a tablet terminal or the like. Electronic device 10 includes CPU 11, a communication circuit 12, and SSD 13.

CPU 11 is an arithmetic circuit that controls an operation of electronic device 10. CPU 11 realizes a predetermined function of electronic device 10 by, for example, executing application program 14 stored in SSD 13. CPU 11 may realize a predetermined function by executing application program 14 provided via a communication network.

Communication circuit 12 is a communication circuit for communicating with other devices in accordance with a wireless communication standard and/or a wired communication standard. IEEE 802.11, 4G, and 5G are examples of the wireless communication standard. Ethernet (registered trademark) is an example of the wired communication standard. The communication circuit 12 is connectable to the communication network.

SSD 13 is an example of the recording medium included in electronic device 10 of the present exemplary embodiment. In SSD 13, SSD 13 has a Self-Monitoring Analysis and Reporting Technology (S.M.A.R.T.) function of generating data related to the operating state at a predetermined interval, and stores S.M.A.R.T. information 15 generated by the function. Hereinafter, "S.M.A.R.T." is simply referred to as "SMART". SSD 13 may temporarily store an application program and data. For example, log information to be transmitted to maintenance server 20 is temporarily stored. SSD 13 includes a memory chip including a flash memory, a controller chip for controlling an operation, a substrate on which chips are mounted, and the like.

Although not illustrated, electronic device 10 includes a battery that supplies power to electronic device 10, a substrate on which CPU 11 and the like are mounted, a fan used for internal cooling of electronic device 10, and a memory that functions as a work area of CPU 11. The memory is realized by, for example, a dynamic random access memory (DRAM) or the like.

1-2. Log Information

The log information collected from electronic device 10 will be described with reference to FIG. 2. FIG. 2 is a figure for explaining log information D1 in maintenance system 100.

Log information D1 illustrated in FIG. 2 includes a clock time indicating clock time information, and various kinds of information such as device product number of electronic device 10, serial number of SSD 13, device usage information of electronic device 10, and SMART information 15 of SSD 13 as information related to electronic device 10 and an operating state of SSD 13. Log information D1 is managed with the clock time associated with various kinds of information. The clock time is, for example, a clock time when electronic device 10 transmits various kinds of information to maintenance server 20.

In the example in FIG. 2, log information D1 includes, as the device usage information, temperature measured at a predetermined place in electronic device 10, application information related to application program 14 in operation, power consumption of SSD 13, and used time, manufacture date, and start-using date of electronic device 10.

The temperature in the device usage information is measured at, for example, CPU 11, a memory, a battery, front or back side of a substrate, or a fan of electronic device 10. The battery temperature may be used as outside air temperature for electronic device 10.

Application information in the device usage information is information including the name of application program 14 executed in electronic device 10, the number of writes of application program 14 in SSD 13, and the like. The number of writes is, for example, the accumulated number of writes, but may be a number obtained by taking a difference from the number of writes obtained at the previous cycle of collecting log information D1. Since the number of writes in the SSD is limited, including the number of writes in SSD 13 in log information D1 periodically collected enables further accurately predicting the future operating state of SSD 13.

Maintenance server 20 of the present exemplary embodiment periodically collects the various kinds of log information D1 described above from electronic device 10. Log information D1 is not limited to the example described above, and may be, for example, a part or a combination of the various kinds of information. Furthermore, log information D1 may include other information in addition to or in places of a portion of the example described above. For example, the type of a flash memory included in the memory chip of SSD 13, manufacturer, version information of firmware, and the like may be included in log information D1.

2. Operation

An operation of maintenance system 100 configured as described above will be described.

2-1. Outline of Operation

Figure 3:
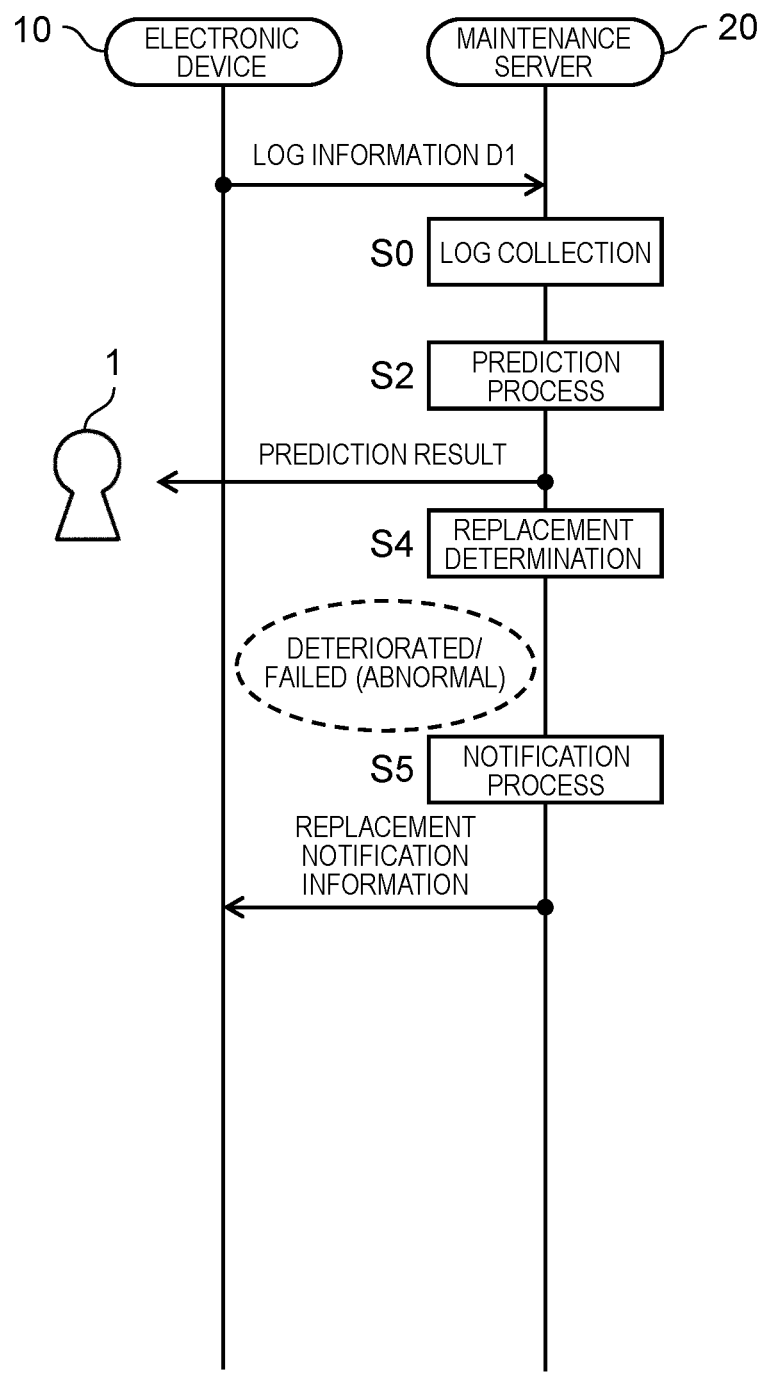
FIG. 3 is a figure for explaining an exemplary operation of the maintenance system according to the first exemplary embodiment.

An outline of an operation of providing maintenance service by maintenance system 100 according to the present exemplary embodiment will be described with reference to FIG. 3. FIG. 3 is a figure for explaining an exemplary operation of maintenance system 100 according to the present exemplary embodiment.

In maintenance system 100, electronic device 10 transmits log information D1 to maintenance server 20 at a predetermined cycle with log information D1 associated with transmission clock time. The predetermined cycle is previously determined depending on, for example, the type of information in log information D1. For the device usage information, for example, an hour cycle may be used from a viewpoint of detecting a detailed temporal change, and for other information, a day cycle may be used from a viewpoint of detecting a change in a longer-term or because a frequent temporal change is not expected.

Maintenance server 20 collects log information D1 from electronic device 10 at, for example, a cycle in synchronization with a cycle of transmission by electronic device 10 (S0). After collecting log information D1 for a predetermined number of cycles, maintenance server 20 inputs log information D1 collected before a current clock time to prediction model 27, and predicts the operating state after the current clock time of SSD 13 included in electronic device 10 (S2). The predetermined number of cycles for collecting the device usage information of log information D1, for example, is set to a sufficiently large number from a viewpoint of using temporal change of log information D1 for predicting the operating state. Since the predetermined number of cycles may vary depending on the type of SSD 13, for example, the model number of a controller chip of SSD 13, a version of firmware, whether it is a single, multi-, or triple level cell, and the like, an exemplary specific numerical value is not presented.

In step S2, prediction model 27 of maintenance server 20 predicts "normal", "failed", or "deteriorated" as the operating state of SSD 13. Note that, "failed" and "deteriorated" predicted by prediction model 27 of the present exemplary embodiment are examples of SSD 13 being "abnormal". The operating state may be predicted to be "abnormal" or "normal". For example, a physical factor such as damage of a memory chip, damage of a controller chip, and damage of a substrate, and a logical factor such as damage of a file system in SSD 13 may be a factor of predicting that SSD 13 is abnormal. For example, the operating state of SSD 13 (recording medium) may be determined to be "abnormal" due to the presence of such a physical factor and/or a logical factor, and may be determined to be "normal" when no physical factor nor logical factor is present.

Maintenance server 20 of the present exemplary embodiment transmits the prediction result of the operating state of SSD 13 predicted by prediction model 27 to user 1 of the maintenance service provided by maintenance system 100. User 1 may be, for example, a management department of a company having electronic device 10, or may be a user of electronic device 10. User 1 can receive the prediction result by means such as an information processing terminal of the management department, electronic device 10, e-mail, or the like and check and manage the operating state of SSD 13 of electronic device 10.

Maintenance server 20 determines whether the prediction result of the operating state is "deteriorated" or "failed" (that is, "abnormal") (S4). When the prediction result is deteriorated or failed, maintenance server 20 transmits replacement notification information related to replacement of SSD 13 to electronic device 10 (S5). User 1 can request, based on the replacement notification information, a company that performs replacement of SSDs (for example, a maintenance service provider) to replace SSD 13.

In the present exemplary embodiment, in maintenance system 100 as described above, maintenance server 20 predicts the operating state after the current clock time of SSD 13 included in electronic device 10 (S2), and transmits the replacement notification information to electronic device 10 when the operating state is abnormal (S5). According to this maintenance system 100, for example, measures can be taken before an abnormality occurs in SSD 13 and restoration becomes difficult, and thus a loss of data in SSD 13 and a time during which electronic device 10 cannot be used can be reduced. Accordingly, a maintenance service that is highly convenient for user 1 and is proactive can be provided.

2-2. Operation of Maintenance Server

An operation of maintenance server 20 in present system 100 will be described below with reference to FIGS. 4 and 5.

Figure 4:
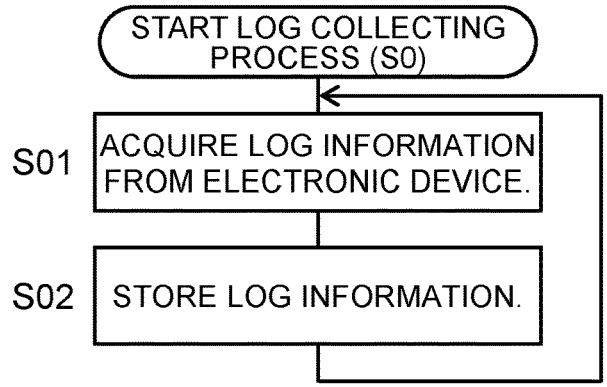
FIG. 4 is a flowchart illustrating a log collecting process.

FIG. 4 is a flowchart illustrating a log collecting process (S0) of collecting log information D1 from electronic device 10. The flowchart starts when, for example, log information D1 is first received from electronic device 10, and then each process is executed by CPU 21 of maintenance server 20.

CPU 21 acquires log information D1 transmitted from electronic device 10 via, for example, communication circuit 22 (S01). CPU 21 stores acquired log information D1 in, for example, database 28 of storage device 23 (S02).

CPU 21 periodically collects log information D1 by repeatedly executing the above processing at, for example, the predetermined cycle described above (S0).

Figure 5:
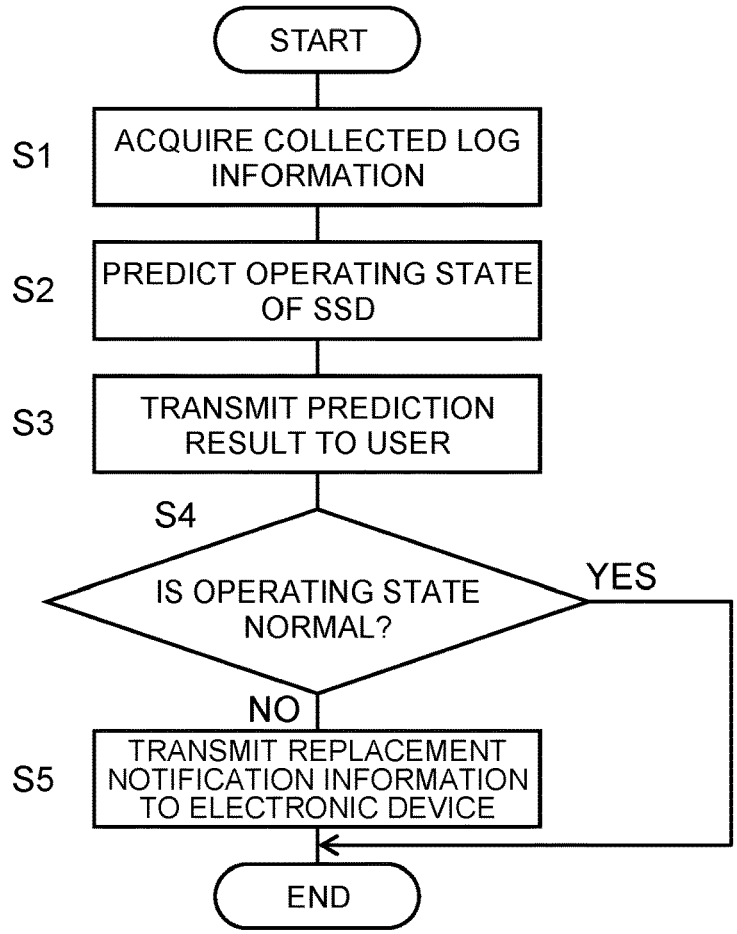
FIG. 5 is a flowchart illustrating an operation of the maintenance server according to the first exemplary embodiment.

FIG. 5 is a flowchart illustrating an operation of maintenance server 20 according to the present exemplary embodiment. This flowchart starts, for example, every time the log collecting process (S0) is repeated a predetermined number of cycles, corresponding to the process after S0 in FIG. 3. Each process in the flowchart is executed by, for example, CPU 21 of maintenance server 20.

First, CPU 21 acquires log information D1 collected by the current clock time from, for example, database 28 (S1).

CPU 21 inputs acquired log information D1 to prediction model 27 to predict the operating state after the current clock time of SSD 13 (S2). At this time, in log information D1, for example, data subjected to preprocessing for obtaining a difference between two consecutive clock times may be input to prediction model 27. After the prediction of the operating state (S2), for example, CPU 21 transmits the prediction result to user 1 by communication circuit 22 (S3).

CPU 21 determines whether the predicted operating state is normal (S4), and, when the operating state is not normal (that is, abnormal including deteriorated or failed) (NO in S4), transmits replacement notification information to electronic device 10 (S5).

The replacement notification information is used, for example, to provide user 1 with a service of replacing SSD 13 by a maintenance service provider, and includes a contract number of maintenance service, a replacement code indicating identification information on replacement, dispatch destination and date and time of SSD 13, and the like. The contract number is, for example, a number associated with the device number of electronic device 10.

After the replacement notification information is transmitted (S5) or when the operating state is normal (YES in S4), CPU 21 ends the process illustrated in the flowchart. Thereafter, when the log collecting process (S0) is executed a predetermined number of cycles, the process in the flowchart is started again.

As described above, when the result of predicting the operating state of SSD 13 (S2) using log information D1 collected from electronic device 10 including SSD 13 is other than normal (NO in S4), CPU 21 of maintenance server 20 transmits the replacement notification information to electronic device 10 (S5). Accordingly, user 1 of the maintenance service can easily perform a procedure related to replacement of SSD 13 using, for example, the replacement notification information, which enhances convenience of user 1.

2-3. Operation of Prediction Model

An operation of prediction model 27 executed in step S2 in FIGS. 3 and 5 will be described with reference to FIG. 6.

Figure 6:
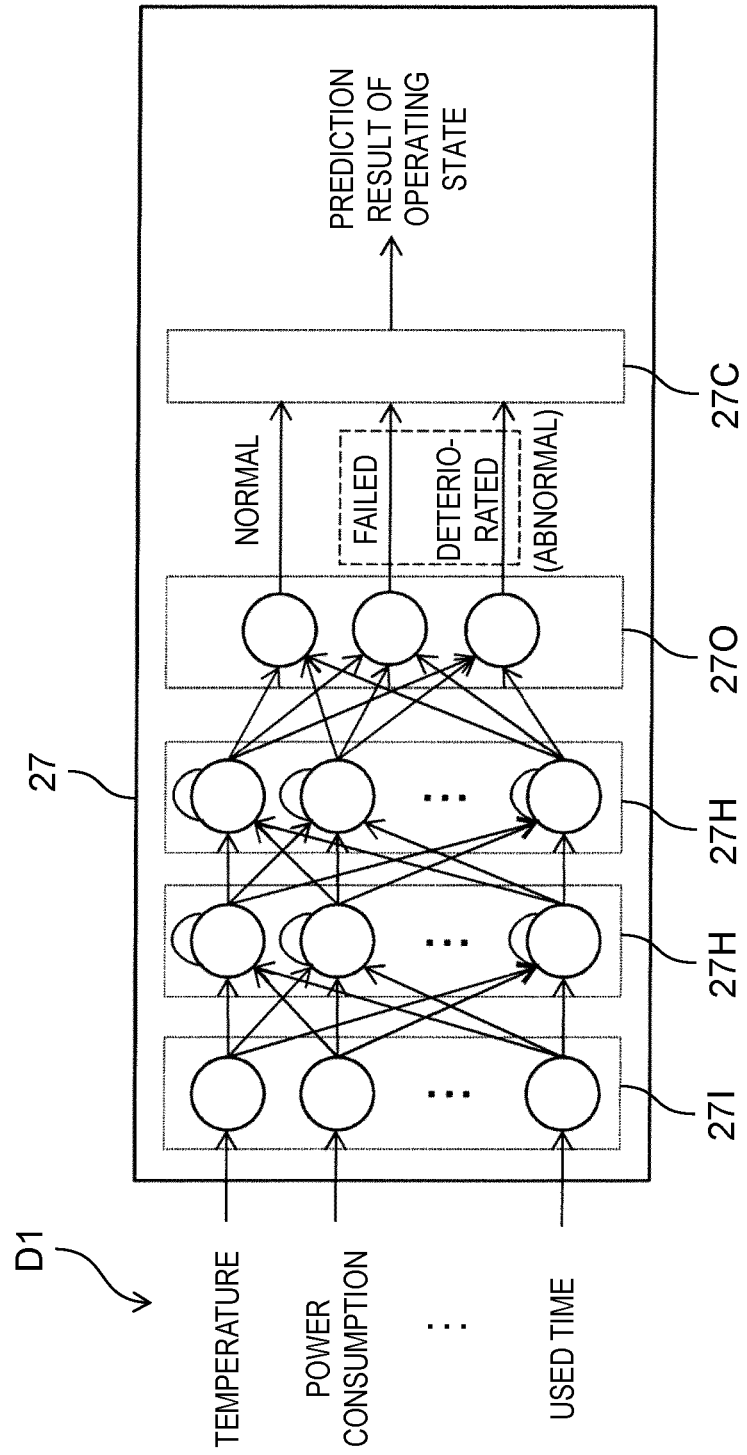
FIG. 6 is a figure for explaining an exemplary operation of a prediction model.

FIG. 6 is a figure for explaining an exemplary operation of prediction model 27. Prediction model 27 of the present exemplary embodiment is configured as, for example, a recurrent neural network (RNN). Prediction model 27 in FIG. 6 includes input layer 27I, one or a plurality of hidden layers 27H, output layer 27O, and classifier 27C. Although an example in FIG. 6 includes two hidden layers 27H, the number of hidden layers 27H may be 1 or 3 or more. Each of layers 27I, 27H, and 27O has a plurality of units or nodes having parameters.

When log information D1 is collected from electronic device 10 a plurality of times by the current clock time and sequentially input to input layer 27I at clock times each corresponding to the respective clock time of collection, prediction model 27 causes log information D1 to propagate to hidden layer 27H according to the weighting of input values by the parameters. At each clock time, prediction model 27 applies weighting by parameters to the input values at the clock time and output values at the previous clock time of hidden layer 27H, and calculates output values of hidden layer 27H at the clock time.

Prediction model 27 causes the calculated output values of hidden layer 27H corresponding to the last clock time in log information D1, that has been input, to propagate to output layer 27O via the parameters, and calculates probability distribution of the operating state after the current clock time of SSD 13 by applying, for example, the Softmax function. In the example in FIG. 6, probabilities that the operating state is respectively "normal", "failed", and "deteriorated" are calculated in output layer 27O. Note that, the probability of "abnormal" including failed and deteriorated may be calculated.

In prediction model 27, for example, classifier 27C outputs the operating state having the highest probability in the probability distribution output from output layer 27O as the prediction result of the operating state.

By the operation of prediction model 27 as described above, the operating state after the current clock time of SSD 13 included in electronic device 10 can be predicted based on log information D1 collected by the current clock time from electronic device 10 and by reflecting a history of change in log information D1.

2-4. Generation of Prediction Model

A process of generating, by machine learning, prediction model 27 that operates as described above will be described with reference to FIG. 7.

FIG. 7 is a figure for explaining a process of generating prediction model 27 using training data. The process of generating prediction model 27 is executed by CPU 21 in, for example, maintenance server 20.

FIG. 7 illustrates training data D2 for prediction model 27 stored in, for example, database 28 in the present exemplary embodiment. For a plurality of electronic devices (examples of training electronic devices) each including an SSD (an example of training storage medium), training data D2 is collected from the electronic device including the SSD as a recording medium as information in which each piece of log information D1 (an example of training log information) collected at each of a plurality of clock times within a predetermined period is associated with state information in which the operating state at each clock time of the SSD is determined. The state information is correct information indicating that the operating state is normal, deteriorated, or failed. The predetermined period is set as, for example, a period corresponding to a predetermined number of cycles in the log collecting process (S0 in FIG. 3).

In the example in FIG. 7, with time t5 as a reference clock time, CPU 21 inputs to prediction model 27 input data I1 for five clock times collected from an electronic device that has device product number X1 by the time t5, and predicts the operating state at a clock time just after the reference clock time (that is, clock time t6) of the electronic device. In prediction model 27 configured as an RNN as illustrated in FIG. 6, for example, cross entropy is used as an error function. CPU 21 updates the parameters of prediction model 27 so as to minimize an error between correct state information O1 and the output which is the prediction of the operating state made by prediction model 27. For example, CPU 21 performs training of prediction model 27 by repeating such a process for the data periodically collected from the electronic device that has device product number X1 in training data D2 and the data collected from electronic devices that have different device product numbers.

By the process described above, prediction model 27 for predicting the operating state of SSD 13 can be generated using training data D2. The information related to the operating state of the SSD in log information D1 of training data D2 may include SMART information 15 obtained by restoring the data in a failed SSD. This expands training data D2, and for example, can raise the accuracy of prediction by prediction model 27. In addition, in input data I1, for example, data subjected to preprocessing of obtaining a difference between two consecutive clock times may be used for training prediction model 27.

3. Effects

As described above, in maintenance system 100 according to the present exemplary embodiment, the method for providing maintenance service for SSD 13 included in electronic device 10 is executed by CPU 21 of maintenance server 20 as an example of an arithmetic circuit of a computer. The method includes a step of periodically collecting log information D1 from electronic device 10 (S0), a step of inputting log information D1 collected before the current clock time from the electronic device to prediction model 27 to predict the operating state after the current clock time of SSD 13 (S2), and a step of transmitting the replacement notification information that is based on the prediction result to electronic device 10 (S5). Prediction model 27 is generated by performing machine learning using, as training data D2, log information D1 collected within a predetermined period from a plurality of electronic devices each including a recording medium by the reference clock time, and the state information indicating the operating state of the recording medium determined after the reference clock time included in each of a plurality of electronic devices. Log information D1 is information in which clock time information is associated with information related to the electronic device and the operating state of the SSD included in the electronic device. The operating state is abnormal or normal.

According to the method for providing maintenance service described above, log information D1 collected from electronic device 10 by the current clock time (S0) is input to prediction model 27, and the operating state after the current clock time of SSD 13 of electronic device 10 is predicted (S2). The replacement notification information based on the prediction result is transmitted to electronic device 10 (S5), which makes it easy for user 1 of the maintenance service to take a measure related to maintenance such as early replacement of SSD 13. This enhances convenience of user 1.

In the present exemplary embodiment, abnormality of the operating state is deteriorated or failed. Thus, the mode of abnormality can be distinguished in the prediction result, which enhances convenience of user 1. Note that, deteriorated and failed are examples of abnormalities of the SSD. A different class may be used as an abnormality.

In the present exemplary embodiment, the method for providing maintenance service described above further includes a step of transmitting the prediction result to user 1 of the maintenance service (S3). The replacement notification information is transmitted when the operating state in the prediction result is other than normal (NO in S4) (S5). Even when the operating state is normal, for example, user 1 can use the prediction result for management of SSD 13.

In the present exemplary embodiment, SSD (solid state drive) 13 is an example of a recording medium included in electronic device 10. Note that, the present disclosure may be applied to provide maintenance service for a recording medium other than the SSD, such as a hard disk drive (HDD) included in electronic device 10.

In the present exemplary embodiment, the information related to the operating state in log information D1 includes usage information of the electronic device and SMART information 15 of the SSD. Maintenance server 20 can predict the operating state of SSD 13 by prediction model 27 using such log information D1.

In the present exemplary embodiment, the usage information includes a temperature measured in the electronic device, an application program executed in the electronic device, power consumption of the SSD in the electronic device, and used time, manufacture date, and/or start-using date of the electronic device. A combination of one or more of the above information may be used as usage information.

In the present exemplary embodiment, training data D2 includes SMART information 15, obtained by restoring data in a failed SSD, in the information related to the operating state in log information D1. SMART information 15 may be provided from, for example, a company that performs restoration of data in an SSD. Although the accuracy of prediction made by prediction model 27 can be improved using SMART information 15, SMART information 15 may not be included in training data D2.

In the present exemplary embodiment, maintenance server 20 is an example of a system for providing maintenance service for SSD 13 (recording medium) included in electronic device 10. Maintenance server 20 includes CPU 21 (arithmetic circuit), storage device 23 that stores prediction model 27 for predicting the operating state of SSD 13, and communication circuit 22 that receives log information D1 from electronic device 10. CPU 21 periodically collects log information D1 from electronic device 10 (S0), inputs log information D1 collected before the current clock time from electronic device 10 to prediction model 27 to cause prediction model 27 to predict the operating state after the current clock time of the recording medium (S2), and transmits by communication circuit 22 the replacement notification information that is based on the prediction result to electronic device 10 (S5). Prediction model 27 is generated by performing machine learning using, as training data D2, log information D1 collected within a predetermined period up to the reference clock time from a plurality of electronic devices each including an SSD, and the state information indicating the operating state of the SSD determined after the reference clock time included in each of the plurality of electronic devices. Log information D1 is information in which clock time information is associated with information related to the electronic device and the operating state of the recording medium included in the electronic device. The operating state is abnormal or normal.

In the present exemplary embodiment, CPU 21 transmits the prediction result and the replacement notification information by communication circuit 22 (S3, S5).

In the present exemplary embodiment, the method for providing maintenance service is executed by CPU 21 of maintenance server 20, but the present invention is not limited to this configuration. The method may be executed by maintenance server 20 and another information processing device operating in cooperation. In this case, for example, the steps of the method are executed by an arithmetic circuit of each of maintenance server 20 and another information processing device (computer).

Second Exemplary Embodiment

In the first exemplary embodiment, maintenance system 100 in which maintenance server 20 transmits the replacement notification information to electronic device 10 has been described as an example of a method for providing maintenance service for SSD 13 included in electronic device 10. In a second exemplary embodiment, maintenance system 100 that can be used to provide maintenance service including replacement of SSD 13 of electronic device 10 that has received replacement notification information and, in some cases, restoration of data in SSD 13 in addition to an operation as that in the first exemplary embodiment will be described.

Maintenance system 100 according to the present exemplary embodiment will be described below, but description of configurations and operations similar to those of maintenance system 100 according to the first exemplary embodiment will be omitted as appropriate.

In maintenance system 100 of the present exemplary embodiment, database 28 in storage device 23 of maintenance server 20 stores management information on maintenance service and registration information related to SSD 13 of electronic device 10 in addition to log information D1 and training data. The management information is, for example, information used by a maintenance service provider to provide user 1 with a replacement SSD, and manages contract information between the provider and the user, replacement history indicating whether SSD 13 has been replaced in the past, and the like. The registration information is information including the product number and the like of SSD 13. In addition, maintenance server 20 of the present exemplary embodiment includes, in addition to the configuration of the first exemplary embodiment (FIG. 1), a display that presents information and an input device such as a touch panel and a keyboard.

An outline of an operation of providing maintenance service by maintenance system 100 according to the present exemplary embodiment will be described with reference to FIG. 8.

Figure 8:
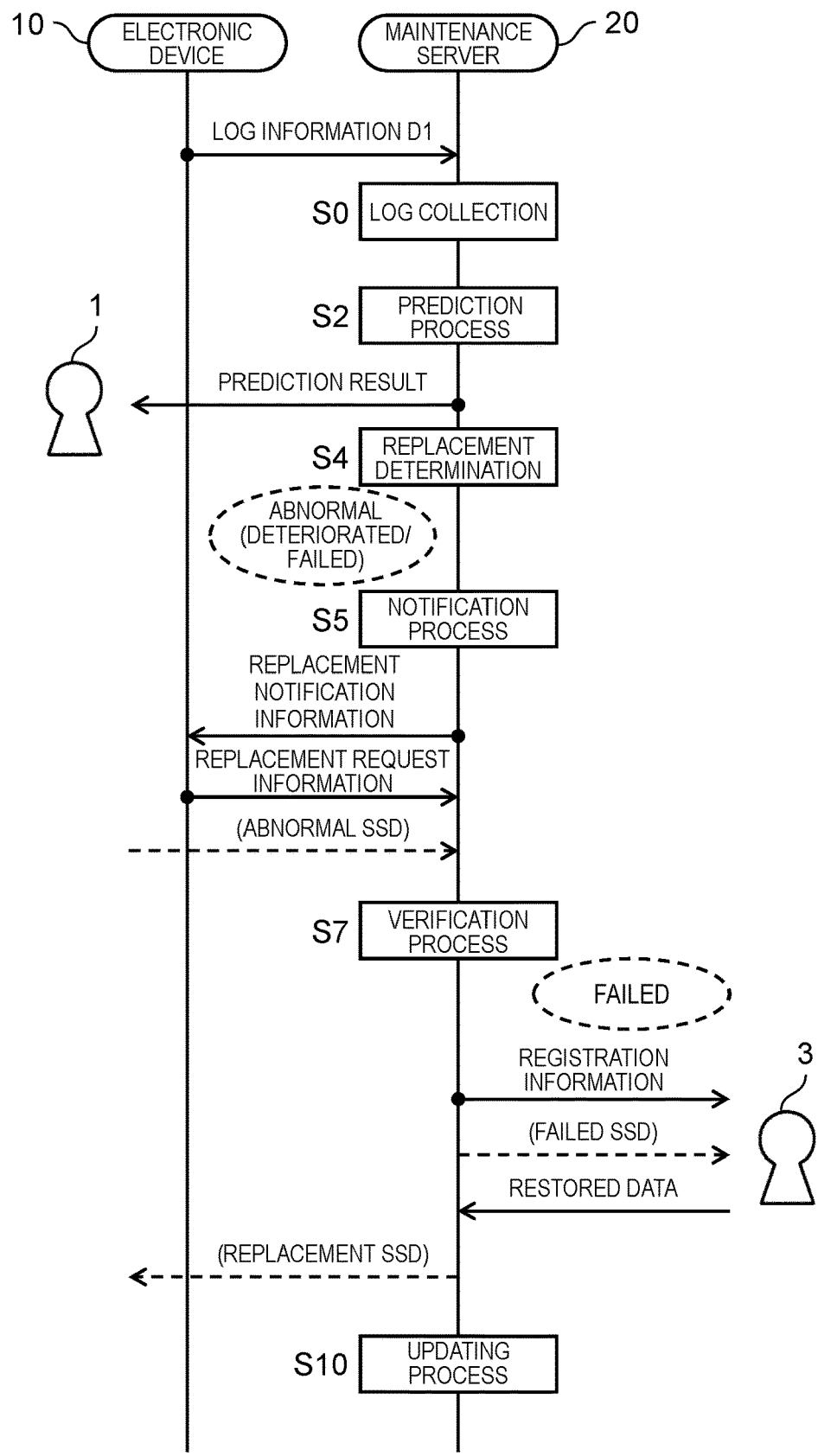
FIG. 8 is a figure for explaining an exemplary operation of a maintenance system according to a second exemplary embodiment.

FIG. 8 is a figure for explaining an exemplary operation of maintenance system 100 according to the second exemplary embodiment. In the present exemplary embodiment, similarly to the operation of the first exemplary embodiment, maintenance server 20 collects log information D1 from electronic device 10 (S0), predicts the operating state of SSD 13 of electronic device 10 (S2), and transmits replacement notification information to electronic device 10 when the operating state is abnormal (S5).

In maintenance system 100 of the present exemplary embodiment, after the replacement notification information is transmitted (S5), replacement request information transmitted from electronic device 10 in response to the replacement notification information is received by maintenance server 20. The replacement request information includes, for example, a contract number included in the replacement notification information, a replacement code, and information related to an operating state of SSD 13 at the time of transmission of the replacement request information. In addition, for example, SSD 13 of which operating state is predicted to be abnormal is dispatched from user 1 to the maintenance service provider.

Maintenance server 20 performs verification between the management information and the received replacement request information (S7), and presents information on, for example, whether a contract number exists in the management information and replacement history of SSD 13 to the maintenance service provider. For example, in addition to this information, the maintenance service provider can check the replacement code and the operating state at the time of transmission included in the replacement request information, and perform a replacement operation such as migrating the data in SSD 13 to a replacement SSD.

There may be a case where SSD 13 does not operate during the replacement operation because, for example, the operating state of SSD 13 is failed when the replacement request information is transmitted, and the maintenance service provider cannot extract the data in SSD 13. In this regard, in the present exemplary embodiment, for example, maintenance server 20 transmits the registration information of SSD 13 from the maintenance service provider to restoration company 3 that restores data recorded in an SSD. Then, the maintenance service provider dispatches SSD 13 from which data cannot be extracted due to a failure or the like to restoration company 3. As a result, even in a case where preventive replacement based on prediction of the operating state cannot be performed, such as a sudden failure of SSD 13, the maintenance service provider can receive restored data in SSD 13 from restoration company 3 and perform a replacement operation of SSD 13.

After the replacement operation, when the replacement SSD to which the data in SSD 13 has been migrated is dispatched to user 1 by the maintenance service provider, for example, a replacement history related to the replacement operation is input to maintenance server 20 to update the management information (S10).

According to maintenance system 100 as described above, the replacement service for SSD 13 using the replacement notification information as part of maintenance service can be provided readily and efficiently to user 1, which enhances convenience of user 1. In addition, for the maintenance service provider, the demand for a replacement SSD can be predicted based on a prediction result of the operating state, and necessary stock of SSDs to provide the service can be secured while reducing excessive stock.

An operation of maintenance server 20 of maintenance system 100 of the second exemplary embodiment will be described below with reference to FIG. 9.

FIG. 9 is a flowchart illustrating an operation of maintenance server 20 according to the second exemplary embodiment. In this flowchart, for example, CPU 21 of maintenance server 20 executes processes, corresponding to the process after S0 in FIG. 8. The processes in steps S1 to S5 are executed similarly to the operation of maintenance server 20 of the first exemplary embodiment (FIG. 5).

After the replacement notification information is transmitted (S5), CPU 21 receives replacement request information from electronic device 10 by, for example, communication circuit 22 (S6). CPU 21 performs verification between the received request information and management information previously stored in database 28 (S7), and presents the verification result, for example, on a display of maintenance server 20.

CPU 21 determines whether the state of SSD 13 meets a predetermined condition (S8). For example, that the operating state of SSD 13 at the time when the replacement request information is transmitted is failed is previously determined as a predetermined condition. Alternatively, the predetermined condition may be, for example, that the replacement code in the replacement request information indicates that SSD 13 has failed or that the replacement code indicates damage of data in SSD 13. In the former case, SSD 13 may no longer operate. In the latter case, SSD 13 may be unstable but is still operable. The replacement code in the replacement request information can be designated according to the state of SSD 13.

When the state of SSD 13 meets the predetermined condition (YES in S8), CPU 21 transmits the registration information related to SSD 13 to restoration company 3 (S9). Thereafter, the data in SSD 13 restored by restoration company 3 may be transmitted to maintenance server 20.

After transmission of the registration information (S9), CPU 21 acquires from the input device, for example, information indicating the replacement history that has been input by the maintenance service provider who has performed the replacement operation on SSD 13, and updates the management information so as to reflect the replacement history (S10). When the state of SSD 13 does not meet the predetermined condition (NO in S8), CPU 21 updates the management information without executing the process in step S9 (S10).

As described above, in maintenance system 100 according to the present exemplary embodiment, the method for providing maintenance service for SSD 13 included in electronic device 10 is executed by CPU 21 of maintenance server 20, and further includes a step of receiving the replacement request information for SSD 13 from user 1 (S6). This enables, for example, providing maintenance service including replacement of SSD 13 using the replacement notification information, which enhances convenience of user 1.

In the present exemplary embodiment, the method for providing maintenance service further includes a step of performing, when the replacement request information is received, verification between the replacement request information and management information that is for the maintenance service provider to provide the replacement SSD to user 1 (S7), and a step of updating the management information with information indicating the replacement history of replacing SSD 13 with the replacement SSD (S10). Accordingly, the efficiency of providing maintenance service including replacement of SSD 13 can be enhanced.

In the present exemplary embodiment, the method for providing maintenance service further includes a step of transmitting the registration information related to SSD 13 to restoration company 3, which is an example of a company that restores data in an SSD, when the operating state is abnormal and the state of SSD 13 meets the predetermined condition (YES in S8) (S9). Accordingly, data loss in SSD 13 can be prevented even when, for example, a sudden failure occurs in SSD 13, and thus convenience of user 1 can be enhanced.

In the present exemplary embodiment, CPU 21 receives the replacement request information (S6) and transmits the registration information (S9) by communication circuit 22.

In addition, storage device 23 of maintenance server 20 stores the management information.

Other Exemplary Embodiments

The first exemplary embodiment and the second exemplary embodiment are described above as examples of the present disclosure. However, the present disclosure is applicable not only to these configurations, but is also applicable to other exemplary embodiments. Other exemplary embodiments will be described below.

In the first exemplary embodiment and the second exemplary embodiment, maintenance server 20 transmits the prediction result to user 1 (S3), and according to the operating state in the prediction result (S4) transmits the replacement notification information to electronic device 10 (S5). In the present exemplary embodiment, maintenance server 20 may transmit only the replacement notification information to electronic device 10 without transmitting the prediction result to user 1. In addition, for example, without the determination in step S4 particularly being executed, the prediction result may be transmitted as the replacement notification information.

In the first exemplary embodiment and the second exemplary embodiment, the replacement notification information is used by the maintenance service provider to provide a service of replacing SSD 13. The replacement notification information of the present exemplary embodiment may be used to provide user 1 with a replacement SSD so that user 1 can replace SSD 13. In this case, the maintenance service provider may periodically back up the data in SSD 13 via a communication network or the like, and migrate the data in SSD 13 to the replacement SSD to provide the data to user 1.

In the present exemplary embodiment, a method for providing maintenance service further includes a step of acquiring backup data of SSD 13 from electronic device 10, and the replacement SSD is an SSD to which the backup data has been migrated. In this case, for example, CPU 21 of the maintenance server acquires backup data of SSD 13 from electronic device 10 by communication circuit 22.

In the first exemplary embodiment and the second exemplary embodiment, the process of generating prediction model 27 is executed in maintenance server 20. In the present exemplary embodiment, prediction model 27 generated by an information processing device different from maintenance server 20 may be provided to maintenance server 20 by communication circuit 22.

In the first exemplary embodiment and the second exemplary embodiment, prediction model 27 configured as an RNN has been described. In the present exemplary embodiment, prediction model 27 may be configured to use a convolution neural network (CNN), a support vector machine (SVM), a random forest, or the like other than RNN. Furthermore, a long short-term memory (LSTM), a gated recurrent unit (GRU), or the like may be used for prediction model 27.

In the first exemplary embodiment and the second exemplary embodiment, an example has been described in which the state information in training data D2 is the correct information in which the operating state is determined to be any one of normal, deteriorated, and failed. In the present exemplary embodiment, the state information may correspond to either a normal operating state or an abnormal operating state including deteriorated and failed. In addition, training data D2 may include information indicating a factor by which the operating state is determined to be abnormal.

The present disclosure is not limited to the exemplary embodiments described above, and various modifications can be made. That is, exemplary embodiments obtained by combining technical means appropriately modified by those skilled in the art are also within the scope of the present disclosure.

INDUSTRIAL APPLICABILITY

The present disclosure is applicable to a method and a system for providing maintenance service for a recording medium included in an electronic device.

REFERENCE MARKS IN THE DRAWINGS 1 user
3 restoration company
10 electronic device
20 maintenance server
11, 21 CPU
12, 22 communication circuit
13 SSD
14 application program
15 S.M.A.R.T. information
23 storage device
26 control program
27 prediction model
28 database
D1 log information
D2 training data

The invention claimed is:

1. A method for providing maintenance service for a recording medium included in an electronic device, the method being executed by an arithmetic circuit of one or a plurality of computers, the method comprising:
periodically collecting log information from the electronic device;
inputting the log information collected before a current clock time from the electronic device to a prediction model;
causing the prediction model to predict an operating state of the recording medium, the operating state being after the current clock time; and
transmitting replacement notification information to the electronic device, the replacement notification information being based on a prediction result indicating the operating state that has been predicted,
wherein
the prediction model is generated by performing machine learning using, as training data, (i) training log information collected within a predetermined period up to a reference clock time from a plurality of training electronic devices each including a training recording medium, and (ii) state information indicating an operating state of the training recording medium determined after the reference clock time,
the log information is information associating clock time information with information related to an operating state of the electronic device and the recording medium, and
the operating state that has been predicted is abnormal or normal,
further comprising,
when the operating state that has been predicted is abnormal and a state of the recording medium meets a predetermined condition corresponding to the recording medium being deteriorated, updating management information, the management information being for a provider of the maintenance service to provide a replacement recording medium to the user and,
when the operating state that has been predicted is abnormal and a state of the recording medium meets a predetermined condition corresponding to the recording medium being failed, updating registration information related to the recording medium to a company that restores data in a recording medium,
wherein the transmitting of replacement notification information causes the electronic device to initiate a replacement operation or alert a user to perform a hardware swap, thereby preventing failure of the recording medium before data loss occurs.

2. The method according to claim 1, wherein the abnormal indicating the operating state that has been predicted is deteriorated or failed.

3. The method according to claim 1, further comprising transmitting the prediction result to a user of the maintenance service,
wherein the replacement notification information is transmitted when an operating state indicated by the prediction result is other than normal.

4. The method according to claim 1, wherein the recording medium is a solid state drive.

5. The method according to claim 1, wherein the log information includes usage information of the electronic device, and Self-Monitoring, Analysis and Reporting Technology (S.M.A.R.T.) information of the recording medium.

6. The method according to claim 5, wherein the usage information includes at least one of: a temperature measured in the electronic device, an application program executed in the electronic device, power consumption of the recording medium, used time of the electronic device, manufacture date of the electronic device, and start-using date of the electronic device.

7. The method according to claim 5, wherein the training log information includes S.M.A.R.T. information obtained by restoring data in a failed recording medium.

8. The method according to claim 1, further comprising receiving replacement request information for the recording medium from a user of the maintenance service.

9. The method according to claim 8, further comprising:
performing, when the replacement request information is received, verification between the replacement request information and management information, the management information being for a provider of the maintenance service to provide a replacement recording medium to the user; and
updating the management information with information indicating a history of replacing the recording medium with the replacement recording medium.

10. The method according to claim 9, further comprising transmitting, when the operating state that has been predicted is abnormal and a state of the recording medium meets a predetermined condition, registration information related to the recording medium to a company that restores data in a recording medium.

11. The method according to claim 9, further comprising acquiring backup data of the recording medium from the electronic device,
wherein the replacement recording medium is a recording medium to which the backup data has been migrated.

12. A system for providing maintenance service for a recording medium included in an electronic device, the system comprising:

an arithmetic circuit;
a storage device that stores a prediction model for predicting an operating state of the recording medium; and
a communication circuit that receives log information from the electronic device, wherein the arithmetic circuit:

periodically collects log information from the electronic device, inputs the log information collected before a current clock time from the electronic device to the prediction model, causes the prediction model to predict an operating state of the recording medium, the operating state being after the current clock time, and transmits, by the communication circuit, replacement notification information to the electronic device, the replacement notification information being based on a prediction result indicating the operating state that has been predicted, the prediction model is generated by performing machine learning using, as training data, (i) training log information collected within a predetermined period up to a reference clock time from a plurality of training electronic devices each including a training recording medium, and (ii) state information indicating an operating state of the training recording medium determined after the reference clock time, the log information is information associating clock time information with information related to an operating state of the electronic device and the recording medium, and the operating state that has been predicted is abnormal or normal, further comprising, when the operating state that has been predicted is abnormal and a state of the recording medium meets a predetermined condition corresponding to the recording medium being deteriorated, the arithmetic circuit updates management information, the management information being for a provider of the maintenance service to provide a replacement recording medium to the user and, when the operating state that has been predicted is abnormal and a state of the recording medium meets a predetermined condition corresponding to the recording medium being failed, updating registration information related to the recording medium to a company that restores data in a recording medium, wherein the transmitting of replacement notification information causes the electronic device to initiate a replacement operation or alert a user to perform a hardware swap, thereby preventing failure of the recording medium before data loss occurs.

13. The system according to claim 12, wherein the abnormal for the operating state that has been predicted is deteriorated or failed.

14. The system according to claim 12, wherein the arithmetic circuit:

transmits, by the communication circuit, the prediction result to a user of the maintenance service, and transmits the replacement notification information when an operating state indicated by the prediction result is other than normal.

15. The system according to claim 12, wherein the recording medium is a solid state drive.

16. The system according to claim 12, wherein the log information includes usage information of the electronic device, and Self-Monitoring, Analysis and Reporting Technology (S.M.A.R.T.) information of the recording medium.

17. The system according to claim 16, wherein the usage information includes at least one of: a temperature measured in the electronic device, an application program executed in the electronic device, power consumption of the recording medium, used time of the electronic device, manufacture date of the electronic device, and start-using date of the electronic device.

18. The system according to claim 16, wherein the training log information includes S.M.A.R.T. information obtained by restoring data in a failed recording medium.

19. The system according to claim 12, wherein the arithmetic circuit receives, by the communication circuit, replacement request information for the recording medium from a user of the maintenance service.

20. The system according to claim 19, wherein the storage device stores management information that is for a provider of the maintenance service to provide a replacement recording medium to the user, and the arithmetic circuit:

performs, when the communication circuit receives the replacement request information, verification between the replacement request information and the management information, and updates the management information with information indicating a history of replacing the recording medium with the replacement recording medium.

21. The system according to claim 20, wherein the arithmetic circuit transmits, by the communication circuit, when the operating state that has been predicted is abnormal and a state of the recording medium meets a predetermined condition, registration information related to the recording medium to a company that restores data in a recording medium.

22. The system according to claim 20, wherein the arithmetic circuit acquires, by the communication circuit, backup data of the recording medium from the electronic device, and the replacement recording medium is a recording medium to which the backup data has been migrated.

* * * * *